United States Patent Office 3,034,950
Patented May 15, 1962

3,034,950
INSECT-REPELLENT COMPOSITION COMPRISING 3-CHLOROPROPYL n-OCTYL SULFOXIDE AND 2-HYDROXYPROPYL n-OCTYL SULFIDE
Lyle D. Goodhue, Bartlesville, and Kenneth E. Cantrel, Dewey, Okla., assignors to Phillips Petroleum Company, a corporation of Delaware
No Drawing. Filed Aug. 17, 1959, Ser. No. 833,934
1 Claim. (Cl. 167—22)

This invention relates to repelling of insects. In one of its aspects, it relates to a novel synergistic composition or combination containing at least one compound having the formula

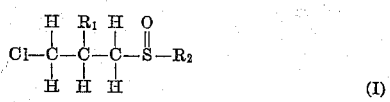

(I)

wherein $R_1$ is selected from the group consisting of hydrogen and methyl and $R_2$ is selected from the group consisting of normal, secondary and tertiary octyl radicals and at least one compound having the formula

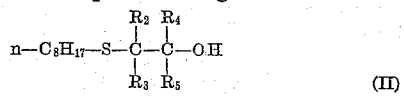

(II)

wherein $R_2$, $R_3$, $R_4$, and $R_5$ are selected from the group consisting of hydrogen and alkyl radicals in any combination such that the total number of carbons in the R groups does not exceed 4. In another of its aspects, the invention relates to a method of combatting or repelling insects such as stable flies, by subjecting said insects to the action of a composition according to the invention.

The use of various agents to combat insects has become widespread in recent years. Although the majority of insect combatting agents are insecticides, increasing attention is also being paid to insect repellents. Insect repellents are advantageous in that they prevent insects such as flies and roaches from frequenting locations where the presence or sight of such insects would be undesirable or unpleasant.

In application Serial Number 733,834, filed May 8, 1958, now U.S. Patent 2,944,932, by Rector P. Louthan and Roy E. Stansbury, there is disclosed and claimed a method for combatting an insect which comprises subjecting said insect to the action of an effective amount of at least one compound selected from the group of compounds having the structural characteristics as follows:

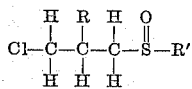

wherein R is selected from the group consisting of H and $CH_3$ and R' is selected from the group consisting of normal, secondary, and tertiary-octyl groups.

Also, in said Serial Number 733,834, there is claimed an insect combatting composition comprising a compound selected from the group of compounds having the structural characteristics as follows:

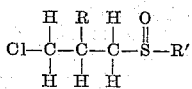

wherein R is selected from the group consisting of H and $CH_3$ and R' is selected from the group consisting of normal, secondary, and tertiary-octyl groups.

We have now discovered that compositions comprising at least one compound of the formula

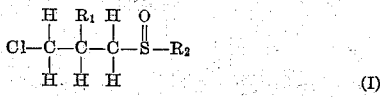

(I)

wherein $R_1$ is selected from the group consisting of hydrogen and methyl, and $R_2$ is selected from the group consisting of normal, secondary and tertiary-octyl radicals and at least one compound of the formula

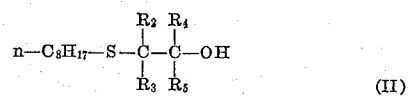

(II)

wherein $R_2$, $R_3$, $R_4$ and $R_5$ are selected from the group consisting of hydrogen and alkyl radicals in any combination such that the total number of carbons in the R groups does not exceed 4 are very effective insect repellents.

It is an object of this invention to provide a synergistic insect repellent composition. It is another object of this invention to provide a method of repelling insects, such as stable flies.

Other aspects, objects and the several advantages of this invention are apparent from this disclosure and the appended claims.

The sulfoxides of the first formula which can be employed in the repellent compositions of this invention are: 3-chloropropyl n-octyl sulfoxide, 3-chloropropyl sec-octyl sulfoxide, 3-chloropropyl tert-octyl sulfoxide, 2-methyl-3-chloropropyl n-octyl sulfoxide, 2-methyl-3-chloropropyl sec-octyl sulfoxide and 2-methyl-3-chloropropyl tert-octyl sulfoxide.

Some examples of compounds of the second structural formula given above which can be employed in the repellent compositions of this invention are: 2-hydroxyethyl n-octyl sulfide, 2-methyl-2-hydroxypropyl n-octyl sulfide, 2-(3-hydroxybutyl) n-octyl sulfide, 3-(4-hydroxyhexyl) n-octyl sulfide, 2-(3-hydroxy-4-methylpentyl) n-octyl sulfide, 2-(1-hydroxyhexyl) n-octyl sulfide, 2-hydroxy-3,3-dimethylbutyl n-octyl sulfide, 2-hydroxybutyl n-octyl sulfide, 2-hydroxy-3-methylbutyl n-octyl sulfide and 2-hydroxypropyl n-octyl sulfide.

The weight ratio of the chlorine-containing sulfoxides to the alkylene oxide-mercaptain condensation products in the repellent compositions of this invention will be within the range between 3:1 and 1:4. Weight ratios of less than 1:4 can be employed if desired, but are not generally desirable. Weight ratios above 3:1 should not be employed, but only because they are no more effective than the alkylene oxide-mercaptan condensation products alone.

It will be understood by those skilled in this art that where compounds have been found to be synergistic in some proportion, these compounds are generally synergistic in all proportions. Thus, it is within the scope of the invention and the appended claims thereto to prepare and to use compositions in which greatly varying ratios or proportions of the ingredients of the composition of the invention are employed. The ratios now set forth are, therefore, to be taken as preferred ratios reading closely on the specific examples set forth herein.

In Patent 2,863,799, issued December 9, 1958, L. D. Goodhue and Kenneth E. Cantrel, there is described and claimed a method of repelling stable flies from a place frequented by said flies which comprises applying at said place, in an amount sufficient to effectively repel said flies, a mono-condensation product of an alkylene oxide and a mercaptan, said product being characterized by the following structural formula

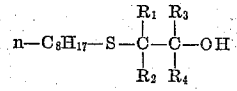

wherein: $R_1$, $R_2$, $R_3$ and $R_4$ are selected from the group consisting of hydrogen, methyl, ethyl, propyl, isopropyl, n-butyl, isobutyl, and tert-butyl radicals; and the total number of carbon atoms in $R_1$, $R_2$, $R_3$, and $R_4$ does not exceed four. There is also set forth and claimed in said patent a composition suitable for repelling stable flies from a place frequented by said flies containing as an essential active ingredient thereof a mono-condensation product of an alkylene oxide with a mercaptan, in an amount sufficient to effectively repel said flies, and a repellent adjuvant as a carrier therefor, present in an amount sufficient to permit said condensation product to act in a desirable manner as a repellent for said flies; said condensation product being characterized by the structural formula

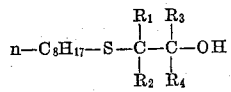

wherein: $R_1$, $R_2$, $R_3$ and $R_4$ are selected from the group consisting of hydrogen, methyl, ethyl, propyl, isopropyl, n-butyl, isobutyl, and tert-butyl radicals; and the total number of carbon atoms in $R_1$, $R_2$, $R_3$, and $R_4$ does not exceed four.

The essence of the present invention is in the finding that a highly representative specific compound of Formula I and a highly representative specific compound of formula II exhibit synergism when used together over a wide range of proportions. Since it is obvious that differing proportions can be used, the invention is not primarily in the proportions although there are set forth herein preferred proportions with which particularly good results have been obtained. Herein, and in the claims, "synergistic proportions" are those proportions in which the ingredients of the composition of the invention will exhibit synergism. At this time, it appears that synergism is exhibited in such wide proportions that this case follows the general rule that synergism will be exhibited in all proportions limited only by practical difficulties in determining the presence of synergism at very low percentages.

The repellent compositions of this invention can be applied to surfaces and/or can be dispersed into spaces from which it is desired to repel insects such as flies, mosquitoes, roaches and the like. When applied to surfaces to repel flies, the repellent will usually be applied in the form of a thin film, such application being made by spraying or painting a composition comprising the repellents of this invention upon said surface. The repellent compositions of this invention are particularly useful for repelling stable flies.

The application of the compositions of the invention to the repelling of stable flies is particularly noted as a preferred and highly useful method of the invention.

In general, an amount within the range between 0.01 and 5 grams of the repellent are deposited on each square foot of surface from which insects are to be repelled. Preferably, from 0.1 to 3 grams per square foot are deposited. The repellent composition of this invention can be applied per se or they can be applied as solutions, emulsions, dusts, wettable powders, and the like. Suitable solvents include naphthas, kerosenes, aromatic hydrocarbons, ketones and isoparaffinic hydrocarbons boiling within the range between 250 and 800° F. which are sold under the trade name Soltrol. When emulsions are used, it is preferred that non-ionic emulsifiers such as alkyl aryl alcohols be employed. The repellents of this invention can also be applied to surfaces dispersed in a wax. When applied in conjunction with a carrier, the repellent will be present in the solution, emulsion, etc. in the range of about 0.3 to 30 percent by weight of the carrier material, preferably between 0.5 and 15 percent by weight. It is to be understood that solutions containing these repellents can be aerosol dispersed by means of a propellant.

The following specific example is intended to illustrate the effectiveness of the new repellent compositions of this invention. It is to be understood that we do not wish to be limited to the particular embodiments shown in this example.

EXAMPLE

A number of runs were made in which the insect repellent compositions of this invention were tested as repellents for the stable fly, Stomoxys calcitrans (Linn.). In these tests, organdy bags fabricated from a sheet of organdy 10" square so that one end of the bag is opened, were impregnated with 1 gram of the sulfoxide to be tested dissolved in 6 to 7 milliliters of acetone and were then suspended on a line to dry. After 24 hours, the bags were drawn over the hand and exposed to several thousand hungry stable flies confined in 30" cubical cages. The flies were reared according to the method reported by Campau, Baker and Morrison in "Journal of Economic Entomology," 46, 524 (1953). The time to the first bite was recorded, and if no bites were sustained in 5 minutes, the bag was withdrawn and the procedure repeated the following day. The period of effective repellency was recorded as the number of days from the day the bags were impregnated to the day when the flies bit constantly. Random bites were not considered to show a loss of effective repellency. The results of these tests are expressed below as Table I.

Table I

| Compound Tested and Dosage in Grams Per Bag | Seconds to 1st, 2nd and 3rd Bites In Five Minutes | | | | | |
|---|---|---|---|---|---|---|
| | 1st Day | 2nd Day | 3rd Day | 4th Day | 5th Day | 6th Day |
| 1.0 gram of 3-chloropropyl-n-octyl sulfoxide (A) | 32, 43, 20 | | | | | |
| 1.0 gram of 2-hydroxypropyl-n-octyl sulfide (B) | 130, 150, [1] NB | 120, 30, 145 | | | | |
| 0.5 gram A+0.5 gram B | NB | NB | NB | 85, NB | NB | 35, 16, 218 |
| 0.25 gram A+0.75 gram B | NB | NB | NB | NB | 80, 67, 20 | |
| 0.75 gram A+0.25 gram B | NB | NB | 30, 7, 10 | | | |

[1] NB=No bites were received.

The present invention permits practicing a method for boosting the effectiveness of the repellent of Serial Number 733,834, especially when it is employed to repel stable flies. Thus, while the repellent of Serial Number 733,834 is quite effective against flies, it is considerably more effective against houseflies than it is against stable flies. This invention provides a method of bringing the effectiveness of the repellent of Serial Number 733,834 up to a level which is more nearly like that of that repellent when it is used against houseflies.

Reasonable variation and modification are possible within the scope of the foregoing disclosure and the appended claim to the invention, the essence of which is that a compound having Formula I in admixture with a compound having Formula II exhibits synergism against insects in repelling the same, particularly against flies such as stable flies.

We claim:

An insect-repellent composition especially suited for the repelling of stable flies comprising 3-chloropropyl n-octyl sulfoxide in admixture with 2-hydroxypropyl n-octyl sulfide the admixture containing said compounds in an overall ratio in the approximate range of 3:1–1:4.

References Cited in the file of this patent

UNITED STATES PATENTS

| | | |
|---|---|---|
| 2,863,799 | Goodhue | Dec. 9, 1958 |
| 2,944,932 | Louthan | July 12, 1960 |